Sept. 6, 1938.　　　　F. M. GUY　　　　2,129,420
COTTER PIN
Filed Feb. 18, 1937
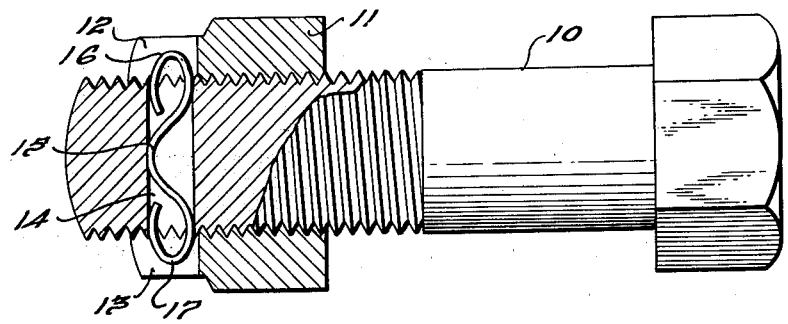
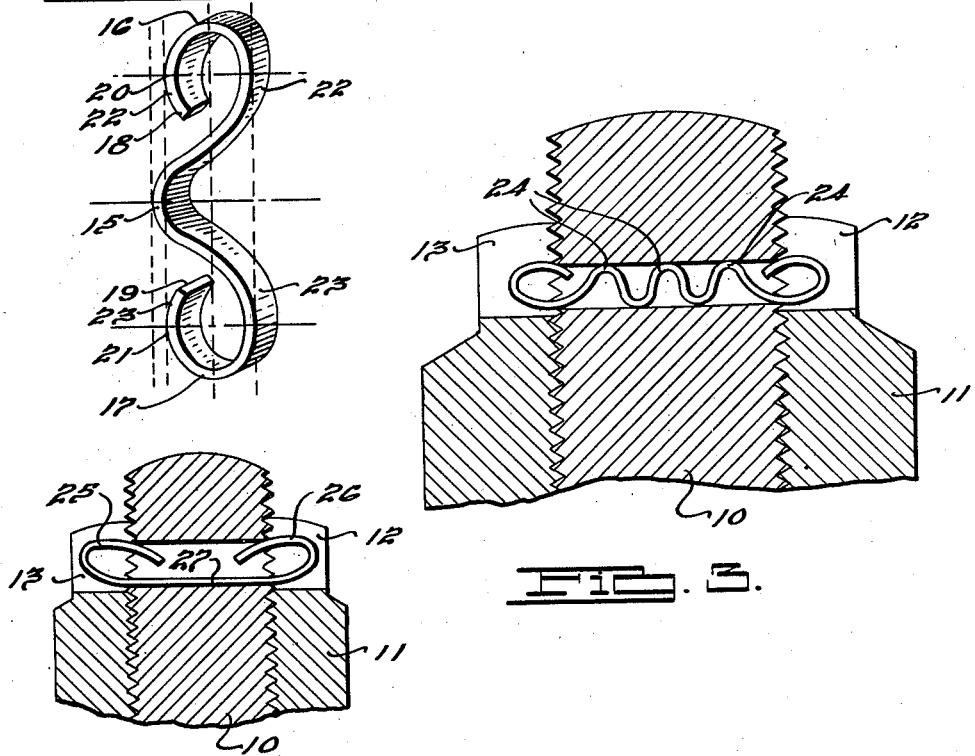
INVENTOR
Frederick M. Guy.
BY Dike, Calver & Gray
ATTORNEYS.

Patented Sept. 6, 1938

2,129,420

UNITED STATES PATENT OFFICE 2,129,420

COTTER PIN

Frederick M. Guy, Detroit, Mich., assignor to Guy and Murton, Incorporated, Detroit, Mich., a corporation of Michigan Application February 18, 1937, Serial No. 126,356

4 Claims. (Cl. 85—8.5)

This invention relates to cotter pins and more particularly to cotter pins of the resilient type.

It is known that when cotter pins are of such construction as to require sharp bends, such pins break at such bends when they are bent or unbent in the process of insertion in position. In addition, operative vibrations produce slight bending and unbending of the pin at the sharp bends, causing fatigue or crystallization of the metal and breaks in the pin usually at the point of weakness caused by such sharp bends. Breakage of the pins may result in loosening of the nut which the pin is intended to secure and lead to the separation of the connected parts, which separation may prove very dangerous. Apart from such direct danger, falling of pins and nuts into inaccessible places and into operating mechanisms may also become a source of considerable danger and damage to the operating mechanism. Conventional types of split cotter pins in addition to the foregoing disadvantages are frequently difficult to insert in the intended place of use.

One of the objects of the present invention is to provide an improved cotter pin of the resilient type which is of symmetrical and balanced construction.

Another object of the invention is to provide an improved cotter pin in which all bends or loops are of comparatively large radii to eliminate excessive strains in the metal of the cotter pin outside such bends or loops.

Still another object of the invention is to provide a cotter pin which can be easily inserted into a bolt hole and nut recess and removed therefrom, and which is of such a construction that it can be repeatedly used without breakage.

A further object of the invention is to provide an improved cotter pin which is dependent principally upon friction for its operative engagement of the bolt hole and in which the shape and size of the pin proper determines and controls the amount of frictional engagement, thereby ensuring proper placement of the pin in the bolt hole and the operative engagement of the pin with the nut.

A still further object of the invention is to provide a cotter pin of such resilient character that it tends to center itself in the bolt hole and to be held securely therein.

A still further object of the invention is to provide a cotter pin which presents when in an operative position a double cross section of the pin stock to the shearing effort produced by the rotation of a loosening nut.

It is an added object of the invention to provide an improved cotter pin which is very simple in construction, convenient to use and which is relatively cheap to manufacture.

Other objects of this invention will appear in the following description and appended claims, reference being had to the accompanying drawing forming a part of this specification wherein like reference characters designate corresponding parts in the several views.

Fig. 1 is a side view partly in section of a bolt having a castellated nut and provided with a cotter pin constructed in accordance with one embodiment of the invention, said cotter pin being shown in its operative position.

Fig. 2 shows in perspective the cotter pin of Fig. 1, removed from the bolt.

Fig. 3 shows a modified form of the cotter pin embodying the present invention.

Fig. 4 shows a still further modification of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there are shown, by way of example, three types of cotter keys embodying the present invention. In Fig. 1 there is illustrated a bolt 10 having a castellated nut 11 threaded thereon. The nut 11 is provided with a series of diametrically opposed recesses 12 and 13, while the bolt 10 is provided with a transverse passage 14 formed in its threaded portion and adapted to register with a pair of the opposed passages 12 and 13 of said nut 11. Inserted into said passage there is shown one form of the cotter pin embodying the invention. As shown in Fig. 2, wherein said cotter pin is illustrated separately and in its free or uncompressed state, the cotter pin comprises a strip of resilient material preferably a strip of spring steel or the like, which strip is bent symmetrically with respect to its center to form an arcuate central portion 15 and two symmetrical loops 16 and 17, one loop on each end of said strip. Said loops 16 and 17 are formed by bending the ends of said strip upon themselves on a diameter slightly exceeding the transverse dimension of said passage 14. The latter feature ensures compression of the loops 16 and 17 when the same are inserted into said passage 14. The ends 18 and 19 of said loops 16 and 17 are directed inwardly of the pin and along the lines crossing the longitudinal axis of the pin inwardly of its extremities. I prefer to construct the cotter pin in such a manner that when it is in its free or uncompressed state, the ends 18 and 19 thereof point substantially toward the geometric center of the pin. It is to be noted that the central portion 15 extends in the transverse direction somewhat further than do the portions 20 and 21 of the loops 16 and 17 respectively, which portions lie substantially in planes passing perpendicularly to the longitudinal axis of the pin and through the geometric centers of said loops 16 and 17. The longitudinal dimension of the cotter pin is so selected that the distance between the geometric centers of the loops 16 and 17 is slightly greater than the length of said bolt passage 14. By virtue of said construction is is ensured that when the cotter pin is inserted into the passage 14, it will engage the edges of the bolt 10 at the extremities of the passage 14 with its inwardly converging portions 22 and 23. Such engagement of the bolt by the loops 16 and 17 produces component forces acting along the longitudinal axis of the passage 14 and outwardly of the pin. Said component forces balance each other when the pin is located centrally of the bolt. If the pin is disposed slightly off-center of the bolt, and one of the ends thereof is protruding into the corresponding recess of the nut 11 more than the other end of the loop, said protruding end will produce a smaller component force outwardly of the passage 14, while at the opposite end of the pin the component force will be much greater. In operation, vibrations of the bolt enable said greater component force to pull the cotter pin in the direction of the end which protrudes less, this action continuing until both of said component forces substantially balance each other.

It will be understood in view of the foregoing that my improved pin possesses self-centering characteristics, inasmuch as it tends to center itself with respect to the bolt under operation conditions and to prevent the possibility of its falling out from the bolt passage. Since the central portion 15 is compressed somewhat greater than the loops 16 and 17, it operates to increase the pressure of the loops 16 and 17 on the bolt, which permits making the loops 16 and 17 somewhat smaller than they otherwise would have to be made, thus facilitating insertion of the cotter pin into the bolt passage.

When the cotter pin is inserted in the bolt passage 14 as shown in Fig. 1, the loops 16 and 17 protrude into the nut recesses 12 and 13 and resist rotation of the nut 11 by presenting to the shearing effort two thicknesses of the strip at each end of the pin, such resistance being amply sufficient to prevent uncontrolled rotation and loosening of teh nut 11. For removal of the pin from the passage 14, said pin is simply pushed or pulled out from the passage 14. It may be noted at this instance that my improved cotter pin is removed easily by pulling it out of the passage, since application of a longitudinal pull on one end of the loops operates to stretch the pin and to decrease the transverse dimensions thereof, thereby decreasing the pressure on the walls of the passage 14 and consequently, the amount of friction resulting at the surfaces of contact between the cotter pin and said walls.

Since the loops 16 and 17, as well as the central portion 15 are bent on radii relatively large with respect to the thickness of the strip from which the pin is made, no overstraining of the material in forming a pin common in previous structures takes place in forming my improved cotter pin. The latter feature is important since it prevents breakage of the pins in operation, which breakage is known to have caused separation of the parts connected by means of bolts provided with such pivots, loosening of the nuts, and falling of the pins and nuts into operating mechanisms or into inaccessible places.

The modified structure shown in Fig. 3 differs from the above described preferred structure in the respect that said modified structure is provided with a plurality of, in the present instance three, central portions 24 corresponding to the portion 15 of the preferred structure. Said modified structure may be particularly advantageous under certain conditions where the passage in the bolts are comparatively long, and where it would be impracticable to make such cotter pins of large transverse dimensions. In other respects of construction and operation said modified structure is substantially similar to the preferred structure.

The modified structure in Fig. 4 comprises a strip of resilient material bent to provide loops 25 and 26 substantially similar to the loops 16 and 17 of the preferred structure, its center portion 27 being substantially straight. By virtue of the above construction the self-centering characteristics of the pin are greatly amplified and yet the pin is made simpler in construction and is cheaper to manufacture.

It is to be understood that the cotter pins constructed in accordance with the present invention do not have to be inserted in the passage of the bolt in any particular manner and, therefore, either end of the pin may go into the passage first. Such cotter pins are particularly desirable for use in relatively inaccessible locations, as for example, on bolts used in securing split connecting rod bearings to a crankshaft in an internal combustion engine or the like.

I claim:

1. A cotter pin for use in a bolt hole comprising a strip of resilient material formed to provide two symmetrical loops, one on each end of said strip, the ends of the strip in said loops pointing inwardly of the pin along lines crossing the longitudinal axis of the pin between the extremities thereof, whereby self-alignment within the said bolt hole is insured.

2. A cotter pin comprising a strip of resilient metal formed to provide a convex middle portion, two symmetrical concaved side portions, and two convex end portions, said end portions being formed by bending the ends of the strip toward the center of the pin.

3. A cotter pin of the resilient type adapted to center itself in a bolt hole and comprising a single strip of resilient material, the ends of which are bent upon themselves to provide resilient looped portions of a larger diameter than the diameter of the bolt hole in which the cotter pin is to be inserted.

4. A cotter pin of the resilient type adapted to center itself in a bolt hole and comprising a single strip of resilient material, the ends of which are bent upon themselves to provide resilient looped portions of a larger diameter than the diameter of the bolt hole in which the cotter pin is to be inserted, the body portion intermediate said ends comprising an arcuate section adapted to provide a point of contact with a surface of the said bolt hole intermediate the ends thereof.

FREDERICK M. GUY.